United States Patent
Schmid et al.

(10) Patent No.: US 6,174,849 B1
(45) Date of Patent: Jan. 16, 2001

(54) WATER-FREE SURFACTANT MIXTURES CONTAINING ALCOHOL SULFATES

(75) Inventors: Karl-Heinz Schmid, Mettmann; Ditmar Kischkel, Monheim; Thomas Krohnen, Duesseldorf; Andreas Syldath, Monheim, all of (DE)

(73) Assignee: Henkel Kommanditgesellschaft auf Aktien, Duesseldorf (DE)

( * ) Notice: Under 35 U.S.C. 154(b), the term of this patent shall be extended for 0 days.

(21) Appl. No.: 09/297,450

(22) PCT Filed: Oct. 21, 1997

(86) PCT No.: PCT/EP97/05799

§ 371 Date: Apr. 30, 1999

§ 102(e) Date: Apr. 30, 1999

(87) PCT Pub. No.: WO98/18889

PCT Pub. Date: May 7, 1998

(30) Foreign Application Priority Data

Oct. 30, 1996 (DE) ............................... 196 43 855

(51) Int. Cl.$^7$ ................................... C11D 17/00
(52) U.S. Cl. .................. 510/414; 510/426; 510/428; 510/443; 510/446; 510/495
(58) Field of Search .................... 510/428, 450, 510/446, 443, 495, 414, 426

(56) References Cited

U.S. PATENT DOCUMENTS 3,598,747 * 8/1971 Axtell et al. ...................... 252/182
5,824,633 * 10/1998 Kischkel et al. ................... 510/349

FOREIGN PATENT DOCUMENTS

| 21 05 910 | 8/1972 | (DE) . |
|---|---|---|
| 44 15 369 | 8/1995 | (DE) . |
| 4432365 * | 3/1996 | (DE) . |
| 195 10 099 | 8/1996 | (DE) . |
| 0 342 917 | 11/1989 | (EP) . |
| 0 554 991 | 8/1993 | (EP) . |
| 1 272 396 | 8/1961 | (FR) . |
| 1272396 * | 8/1961 | (FR) . |
| WO95/08616 | 3/1995 | (WO) . |
| WO96/08550 | 3/1996 | (WO) . |
| WO96/08616 | 3/1996 | (WO) . |

OTHER PUBLICATIONS

Derwent Patent Abstract (WPAT) No. 96–152146/16.
Derwent Patent Abstract (WPAT) No. 95–293960/39.
Derwent Patent Abstract (WPAT) No. 71–58417s/36.
Derwent Patent Abstract (WPAT) No. 94–322841/40.
Derwent Patent Abstract (WPAT) No. 96–385318/39.

* cited by examiner

*Primary Examiner*—Necholus Ogden
(74) *Attorney, Agent, or Firm*—John E. Drach; Thomas F. Roland; Henry E. Millson, Jr.

(57) ABSTRACT

A water-free surfactant composition is presented having (a) a fatty alcohol sulfate corresponding to the formula $R^1O—SO_3X$ where $R^1$ is a linear alkyl chain containing 16 or 18 carbon atoms and X is an alkali metal, alkaline earth metal, ammonium, alkylammonium, alkanolammonium or glucammonium and (b) an alcohol sulfate corresponding to the formula $R^2O—SO_3X$ where $R^2$ is an alkyl chain containing 12 to 15 carbon atoms consisting of a minimum 20 percent by weight branched alkyl chains and a maximum 80 percent by weight unbranched alkyl chains, and X is an alkali metal or alkaline earth metal, ammonium, alkylammonium, alkanolammonium or glucammonium. The surfactant composition has a reduced potential for irritation and good flowability and solubility in cold water. The surfactant composition is useful in laundry detergents, dishwashing detergents and other cleaners.

9 Claims, No Drawings

WATER-FREE SURFACTANT MIXTURES CONTAINING ALCOHOL SULFATES

BACKGROUND OF THE INVENTION

This application is filed under 35 U.S.C. 371 and claiming priority from PCT/EP97/05799, filed Oct.30, 1996.

1. Field of the Invention

This invention relates to water-free surfactant mixtures with a reduced potential for irritation containing various alcohol sulfates in selected mixing ratios and to their use for the production of surface-active compositions.

2. Priot Art

By virtue of their favorable performance properties and their excellent ecotoxicological compatibility, fatty alcohol sulfates represent anionic surfactants which are acquiring increasing significance for the production of laundry detergents, dishwashing detergents and cleaning compositions.

Highly concentrated, aqueous or water-free solid formulations of anionic surfactants are of course desirable for storage and transportation purposes. Unfortunately, such formulations are attended by the disadvantage that, in contrast to the products diluted to the in-use concentration, they have a highly irritating effect on the skin and mucous membrane which means that more stringent safety-in-use requirements have to be satisfied for marketing. Another disadvantage is that known compositions do not possess sufficient flowability or solubility, especially in cold water.

The use of mixtures of fatty alcohol sulfates based on tallow and coconut alcohol in a ratio by weight of 9:4 to 1:6 for the production of detergents with improved detersive propertiescleaning performance is known from European patent application EP 0 342 917 A2 (Unilever). More particularly, this document describes mixtures of tallow alcohol sulfate and cocoalcohol sulfate in a ratio by weight of 60:40 to 40;60. However, it does not mention either the irritation potential of the mixtures described therein or their flowability or solubility.

European patent application EP 0 554 991 (Unilever) describes water-containing detergent mixtures based on alkyl sulfates in which at least 25% by weight of the alkyl chains contain 10 or 11 carbon atoms. These alkyl chains may be linear, branched, odd-numbered or even-numbered alkyl chains. In addition, these short-chain alkyl sulfates may be mixed with cocoalcohol sulfate. Since these detergent mixtures additionally contain betaines or amine oxides, they show good dermatological compatibility. However, the document in question does not refer either to the solubility or to the flowability of the alkyl sulfates, Accordingly, the complex problem addressed by the invention was to provide new water-free surfactant mixtures based on alcohol sulfates which would be distinguished both by a significantly reduced irritation potential and by improved flowability and solubility.

DESCRIPTION OF THE INVENTION

The present invention relates to water-free surfactant mixtures containing (a) fatty alcohol sulfates corresponding to formula (I):

$$R^1O\text{—}SO_3X \qquad (I)$$

In which $R^1$ is a linear alkyl chain containing 16 and/or 18 carbon atoms and X is an alkali metal and/or alkaline earth metal, ammonium, alkylammonium, alkanolammonium or glucammonium, and (b) alcohol sulfates corresponding to formula (II):

$$R^2O\text{—}SO_3X \qquad (II)$$

in which $R^2$ is an alkyl chain containing 12 to 15 carbon atoms and X is again an alkali metal and/or alkaline earth metal, ammonium, alkyl ammonium, alkanolammonium or glucammonium, in a ratio by weight of 70:30 to 90:10 and preferably 75:25 to 80:20.

Although it was known that, for example, mixtures of fatty alcohol sulfates based on tallow and coconut alcohol, typically in a ratio by weight of 60:40, have very good detersive properties, a synergistic reduction in the potential for irritation coupled with very good applicational properties, more particularly improved flowability and solubility in cold water, has surprisingly been observed within a very narrow, hitherto undisclosed mixing range using specially selected alkyl sulfates.

Alcohol Sulfates

Fatty alcohol sulfates which form component (a) are known anionic surfactants and are normally obtained by reaction of fatty alcohols with sulfating agents, such as sulfuric acid, oleum, chlorosulfonic acid and, in particular, gaseous sulfur trioxide. The resulting sufuric acid semiesters are neutralized with suitable bases in a following step. In the context of the invention, the fatty alcohol sulfates corresponding to formula (I) are sulfation products of fatty alcohols containing 16 to 18 carbon atoms. Typical examples are the sulfates of cetyl alcohol and stearyl alcohol. Technical fatty alcohol cuts, for example tallow alcohol, which may also contain shorter-chain or longer-chain homologs In small amounts, are preferred. Technical fatty alcohol cuts may also be mixed in such a way that an alcohol mixture with the C chain distribution centered on 16 to 18 carbon atoms is obtained. This is of advantage, for example, when the percentage content of vegetable alcohols in the mixture is intended to be as high as possible.

Fatty alcohols which form component (b) are known compounds which are obtained similarly to the alkyl sulfates of component (a) by reaction of the corresponding alcohols with sulfating agents and subsequent neutralization. According to the invention, sulfation products of linear $C_{12-15}$ alcohols obtained by the Alfol process may be used as alcohol sulfates corresponding to formula (II). Sulfation products of $C_{12-15}$ alcohols obtained by one of the conventional oxosyntheses are preferably used as alcohol sulfates (II) in accordance with the invention. The oxosynthesis gives so-called oxoalcohols which are alcohol mixtures containing branched. unbranched, linear and nonlinear alcohols. Alcohol mixtures containing at least 20% by weight of branched and at most 80% by weight of unbranched alcohols containing 12 to 15 carbon atoms are particularly suitable oxoalcohols for the purposes of the invention. Most particularly preferred oxoalcohols are alcohol mixtures which satisfy the additional requirement that at least 30% by weight of odd-numbered and at most 70% by weight of even-numbered $C_{12-15}$ alcohols should be present. Examples of such oxoalcohols are Lial 123®, 125® and 145®, products of Enichem, and Dobanol 23®, 25® and 45®, products of Shell AG.

Accordingly, preferred alcohol sulfates corresponding to formula (II) are those in which at least 20% by weight of $R^2$ stands for a branched alkyl chain and at most 80% by weight for an unbranched alkyl chain containing 12 to 15 carbon atoms. Particularly preferred alcohol sulfates corresponding to formula (II) are those which additionally satisfy the requirement that at least 30% by weight of $R^2$ in formula (II)

stands for an odd-numbered alkyl chain and at most 70% by weight for an even numbered alkyl chain containing 12 to 15 carbon atoms. Typical alcohol sulfates which form component (b) contain (in approximate terms) 42% by weight of dodecyl sulfate and 56% by weight of tridecyl sulfate, the branched component making up 57% by weight, or 20% by weight of do decyl sulfate, 31% by weight of tidecyl sulfate, 29% by weight of tetradecyl sulfate and 19% by weight of pentadecyl sulfate, the branched component making up around 59% by weight, or 62% by weight of tetradecyl sulfate and 38% by weight of pentadecyl sulfate, the branched component making up around 61% by weight. Other typical alcohol sulfates which form component (b) contain the abovementioned alkyl sulfates in approximately the ratios by weight mentioned above although the branched alkyl sulfates make up around 22% by weight The percentages by weight are all based on the total quantity of alkyl sulfates which form component (b).

Mixing of the Alcohol Sulfate Components

The mixing of the alcohol sulfate components is not critical. In the most simple case, the water-containing pastes obtained after neutralization of the crude sulfation products are mixed, for example in a Schugi mixer, and at the same time converted into a water-free particulate product. Similarly, dry-neutralized or spray-dried or superheated steam-ried powders of the two components may also be mixed. It is also possible To prepare a corresponding fatty alcohol mixture and to form the required anionic surfactant mixture in situ by co-sulfation, neutralization and optionally drying. Finally, the acidic sulfation products may also be neutralized together and then further processed. In a preferred embodiment of the invention, the starting material is a conventionally produced tower powder which, if desired, may also contain one of the two fatty alcohol sulfate components in addition to the usual detergent ingredients. The powder is initially introduced into a mixer and, after the continuous addition of at least one of the two alcohol sulfate components, preferably in the form of an aqueous paste, the whole is mixed, dried and optionally further mechanically compacted. A dry detergent powder, granules or an extrudate with excellent detersive properties, a high dissolving rate and a reduced irritation potential is obtained. In another preferred embodiment of the present invention, water-containing pastes with an active substance content of 10 to 60 and preferably 30 to 50% by weight can be dried and, at the same time, granulated in a so-called flash dryer of the type obtainable from VRV, It.

The surfactant mixtures according to the invention are distinguished not only by very good flow properties, good solubility and excellent detersive properties, but above all by a synergistically reduced irritation potential, i.e. improved compatibility with the skin and mucous membrane. Accordingly, they are eminently suitable for the production of laundry detergents, dishwashing detergents and cleaners, more especially solid laundry detergents, in which they may be present in quantities of 1 to 90% by weight and preferably 10 to 50% by weight, based on the particular composition.

EXAMPLES

The flowability of the products was subjectively determined by the clumping test; (++) signifies very good flowability, (+) good flowability, (−) limited flowability and (−−) a marked tendency to clump. To determine solubility, 10 g of the water-free formulations were dissolved or dispersed in 100 ml of water (30° C., 16° d.). After 120 s, the solutions or dispersions were filtered and the residue was dried and weighed out. The residue—as a measure of solubility—is expressed in %-rel based on the quantity used. Solubility was measured as the residue, i.e. the larger the number, the poorer the solubility. The irritation potential was determined by OECD Method No. 404 and EEC Directive 84/449 EEC, Pt. B. 4. The total irritation scores shown were calculated from the irritation scores obtained after 24, 28 and 72 hours. The total irritation score determined in comparison test C1 for a 100% $C_{16/18}$ tallow alcohol sulfate sodium salt was put at 100% and the total irritation scores obtained in the other tests were related to that score. The higher the value, the weaker the irritating effect and the lower the value, the stronger the irritating effect (worse). The results are set out in Table 1. Formulations 1 to 4 correspond to the invention while formulations C1 to C5 are intended for comparison,

TABLE 1

| | Applicational properties | | | | | | | | |
|---|---|---|---|---|---|---|---|---|---|
| Composition | 1 | 2 | 3 | 4 | C1 | C2 | C3 | C4 | C5 |
| $C_{18/18}$ tallow alcohol sulfate Na salt | 75 | 80 | 85 | 90 | 100 | 60 | 40 | 20 | 0 |
| $C_{12-15}$ oxoalcohol sulfate Na salt* | 25 | 20 | 15 | 10 | 0 | 40 | 60 | 80 | 100 |
| Flowability | + | ++ | ++ | ++ | ++ | − | − | −− | −− |
| Solubility - residue [%-rel] | 19 | 25 | 29 | 52 | 70 | 18 | 14 | 8 | 5 |
| Total irritation score [%-rel] | 63 | 75 | 84 | 90 | 100 | 42 | 31 | 20 | 11 |

*) Lial ® 125: ca. 20% by weight dodecyl, 31% by weight tridecyl, 29% by weight tetradecyl, 19% by weight pentadecyl alcohol, ca. 59% by weight being branched; subsequently sulfated and neutralized what is claimed is:

1. A water-free surfactant composition comprising:

(a) a fatty alcohol sulfate corresponding to formula (I):

$$R^1O\text{—}SO_3X \qquad (I)$$

wherein $R^1$ is a linear alkyl chain containing 16 or 18 carbon atoms and X is an alkali metal, alkaline earth metal, ammonium, alkylammonium, aklanolammonium or glucammonium; and (b) an alcohol sulfate corresponding to formula (II):

$$R^2O\text{—}SO_3X \qquad (II)$$

wherein $R^2$ is an alkyl chain containing 12 to 15 carbon atoms consisting of a minimum 20 percent by weight branched alkyl chains and a maximum 80 percent by weight unbranched alkyl chains, and wherein $R^2$ comprises a minimum of 30 percent by weight of odd-numbered alkyl chains and a maximum of 70 percent by weight of even-numbered alkyl chains, and X is an alkali metal or alkaline earth metal, ammonium, alkylammonium, alkanolammonium or glucammonium; and wherein the weight ratio of component (a) to component (b) is from 70:30 to 90:10.

2. The surfactant composition of claim 1 wherein the weight ratio of the fatty alcohol sulfate (a) to the alcohol sulfate (b) is from 75:25 to 80:20.

3. A laundry detergent, dishwashing detergent or cleaner comprising 1 to 90 percent by weight of the composition of claim 1.

4. A laundry detergent, dishwashing detergent or cleaner comprising 10 to 50 percent by weight of the composition of claim 1.

5. A process for producing a laundry detergent, dishwashing detergent or cleaner comprising:

(a) forming a fatty alcohol sulfate corresponding to formula (I):

$$R^1O\text{—}SO_3X \quad (I)$$

wherein $R^1$ is a linear alkyl chain containing 16 or 18 carbon atoms and X is an alkali metal, alkaline earth metal, ammonium, alkylammonium, alkanolammonium or glucammonium;

(b) forming an alcohol sulfate corresponding to formula (II):

$$R^2O\text{—}SO_3X \quad (II)$$

wherein $R^2$ is an alkyl chain containing 12 to 15 carbon atoms consisting of a minimum 20 percent by weight branched alkyl chains and a maximum 80 percent by weight unbranched alkyl chains, and wherein $R^2$ comprises a minimum of 30 percent by weight of odd-numbered alkyl chains and a maximum of 70 percent by weight of even-numbered alkyl chains, and X is an alkali metal or alkaline earth metal, ammonium, alkylammonium, alkanolammonium or glucammonium; and (c) combining the fatty alcohol sulfate (a), the alcohol sulfate (b) and other detergent ingredients to form a detergent or cleaner, wherein the fatty alcohol sulfate (a) and the alcohol sulfate (b) are present as a water-free mixture at some point during said process and wherein components (a) and (b) are present in a weight ratio of from 70:30 to 90:10.

6. The method of claim 5 comprising mixing water-containing pastes of the fatty alcohol sulfate (a) and the alcohol sulfate (b), converting the mixture into a water-free particulate product, and combining the particulate product with other detergent ingredients.

7. The method of claim 5 comprising forming separately dry powders of the fatty alcohol sulfate (a) and the alcohol sulfate (b), mixing the two dried powders together, and combining the dried powder mixture with other detergent ingredients.

8. The method of claim 5 comprising forming a fatty alcohol mixture containing the precursors of the fatty alcohol sulfate (a) and the alcohol sulfate (b), co-sulfating the mixture, neutralizing the sulfated mixture, drying the neutralized mixture, and combining the dried mixture with other detergent ingredients.

9. The method of claim 5 comprising mixing the fatty alcohol sulfate (a) and the alcohol sulfate (b) with a tower powder containing other detergent ingredients, followed by drying of the mixture, wherein at least one of the fatty alcohol sulfate (a) and the alcohol sulfate (b) is mixed in the form of an aqueous paste.

* * * * *